United States Patent [19]

Masel

[11] 4,245,721

[45] Jan. 20, 1981

[54] FLOOR DISTANCE SENSOR FOR AN ELEVATOR CAR

[75] Inventor: Marvin Masel, Teaneck, N.J.

[73] Assignee: Otis Elevator Company, Hartford, Conn.

[21] Appl. No.: 970,783

[22] Filed: Dec. 18, 1978

[51] Int. Cl.³ .............................................. B66B 1/40
[52] U.S. Cl. ................................................. 187/29 R
[58] Field of Search ........................................ 187/29

[56] References Cited
U.S. PATENT DOCUMENTS 3,815,711  6/1974  Hoelscher .............................. 187/29

*Primary Examiner*—B. Dobeck
*Assistant Examiner*—W. E. Duncanson, Jr.
*Attorney, Agent, or Firm*—Robert E. Greenstien

[57] ABSTRACT

A U-shaped channel is mounted on the elevator car. A solid vane is mounted on the shaft wall near each floor. As the car approaches each floor the vane passes between the walls of the U-shaped column. A plurality of photo transmitter-receivers are mounted on the channel. The receivers on one wall and the transmitters on the opposite wall. As the vane passes between the walls, it obscures or occludes the light from the transmitters and the receivers are successively turned on and off in an arrangement indicative of the distance to the floor level.

2 Claims, 4 Drawing Figures

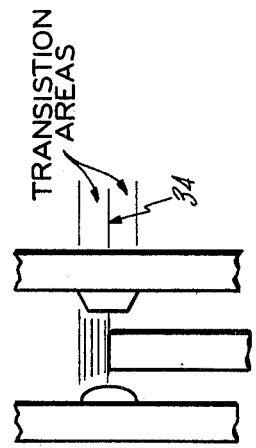
FIG. 3
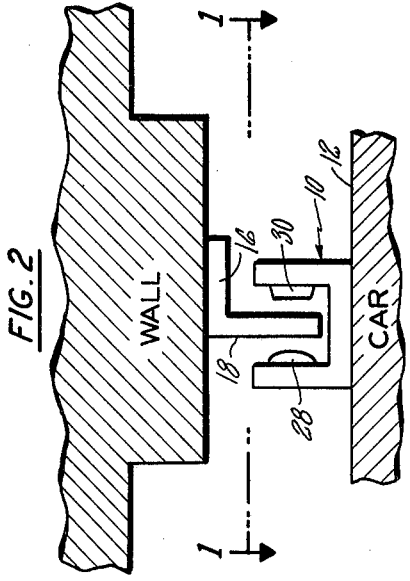
FIG. 2
| POSITION | UNIT (RECEIVER) | | | | | | CAR DISTANCE | |
|---|---|---|---|---|---|---|---|---|
| | 22 | 23 | 24 | 25 | 26 | | | |
| 36 | TR | ON | ON | ON | ON | | E | |
| 38 | OFF | TR | ON | ON | ON | | D | BELOW FLOOR |
| 40 | OFF | OFF | TR | ON | ON | | C | |
| 42 | OFF | OFF | OFF | TR | ON | | B | LEVEL WITH FLOOR |
| 44 | TR | OFF | OFF | OFF | ON | | A | |
| 46 | ON | TR | OFF | OFF | ON | | A | |
| 48 | ON | ON | TR | OFF | ON | | B | ABOVE FLOOR |
| 50 | ON | ON | ON | TR | OFF | | C | |
| 52 | ON | ON | ON | ON | TR | | E | |
| 54 | ON | ON | ON | ON | TR | | | |
TR≡TRANSITION
FIG. 4

FLOOR DISTANCE SENSOR FOR AN ELEVATOR CAR

CROSS-REFERENCE TO RELATED APPLICATIONS

The subject matter of this application relates to the subject matter of my copending application Ser. No. 970,784, titled SELF-ADJUSTING ELEVATOR LEVELING APPARATUS AND METHOD, filed on Dec. 18, 1978 and commonly assigned herewith.

BACKGROUND OF THE INVENTION

This invention relates to apparatus for sensing the distance between an elevator car and each floor as the car ascends and decends in its shaftway, and in particular, a floor distance sensor mounted on the elevator car.

As mentioned in my other application it is extremely difficult to assure repeated proper leveling of an elevator at each floor. Among the reasons for this is that as the building settles and changes size with temperature the shaft length and floor distances change. The cables that are attached to the car also stretch with age and expand and contract with temperature changes. In a typical elevator installation, as an example, a car location encoder can be driven through mechanical linkage to the car in order to detect the direction and distance the car moves in the shaft. The mechanical linkage, usually a steel tape, often stretches with age and expands and contracts with temperature changes. The coefficient of expansion for the tape typically is different from that of the structure. Hence it is widely understood that the distance between elevator floors is dynamic and this alone makes it difficult to properly position the car at each floor over the long-term. The inherent inaccuracies in the simple encoder further aggravate the problem.

Certain prior art systems utilize a mechanical model of the car and its shaft to simulate its movement. The model is connected to the car, usually through the same steel tape that drives the encoder. The model car moves simultaneously with the real car to actuate switches indicating its position with respect to the floor. In its simplest terms, this is a device having an arrangement of switches corresponding to preselected floor locations and an actuator which ascends and decends simultaneously with the car to actuate the switches. This system, however, requires constant readjustment of the switches to compensate for the changes in actual floor location due to the structural variations and the variations in the steel tape previously explained.

There are basically two reasons for requiring the precise car to floor distance. In many elevator installations, particularly high speed ones, the car doors start to open as the car approaches the floor while it is being stopped. Advanced car door opening, as this is called, minimizes the stationary car time at the floor to increase the overall system speed. In order to accomplish this as efficiently and safely as possible it is vital to know precisely when the car is within a preselected distance from the floor before starting to open car doors and slowing the car down. Ideally the doors are fully open just as the car stops at the floor level. They must not be substantially open while the car is still moving because that can be dangerous. The second reason for needing precise floor location information is simply to accomplish exact car leveling at each floor within preselected desirable ranges. Car leveling means positioning the floor of the car as close as possible to the landing floor level. Without accurate information indicating the actual location of the car with respect to the floor landing it is impossible to minimize the leveling distance. This is particularly true in systems utilizing apparatus that determine the distance between the car and the floor through mechanical connection to the car. The previously mentioned shaft encoder and also car model apparatus are examples of such apparatus.

An object of the invention is to provide combined leveling distance and stopping distance information.

In accordance with the present invention the distance to the floor is directly measured from the car by reference to the shaft near each floor. A U-shaped channel is mounted on the elevator car. On one wall of the channel illuminating devices are mounted at preselected distances apart. On the opposite wall there are mounted corresponding light receivers. Each receiver is therefore on when the car is between floors. A vane is fastened to the shaft wall at a preselected distance from each floor. As the car approaches a floor the vane passes between the walls so as to turn the receivers off in succession. The combination of on and off receivers reflects the car's distance above or below floor level. One receiver is in a transition state when the car is at floor level and goes on and off as the car moves outside a preset level zone around the floor level. Hence by detecting which receivers are on and off the position of the car with respect to the floor level can be ascertained precisely. In addition movement outside the level zone can be ascertained regardless of the state of all the receivers. This provides redundancy and better overall accuracy.

Other objects, benefits and features of the invention will be apparent to one skilled in the art from the following detailed description and claims wherein:

DESCRIPTION OF THE DRAWING

FIG. 2 is a plan view of adjacent portions of the car and shaft with the sensor mounted;

FIG. 3 is a portion of the section along line 1—1 in FIG. 2 to show a transmitter-receiver pair in on-off transition; and FIG. 4 is a truth table of the on-off and transition (TR) states for the receivers and the correlated car positions above and below the floor.

DETAILED DESCRIPTION

Figure 1:
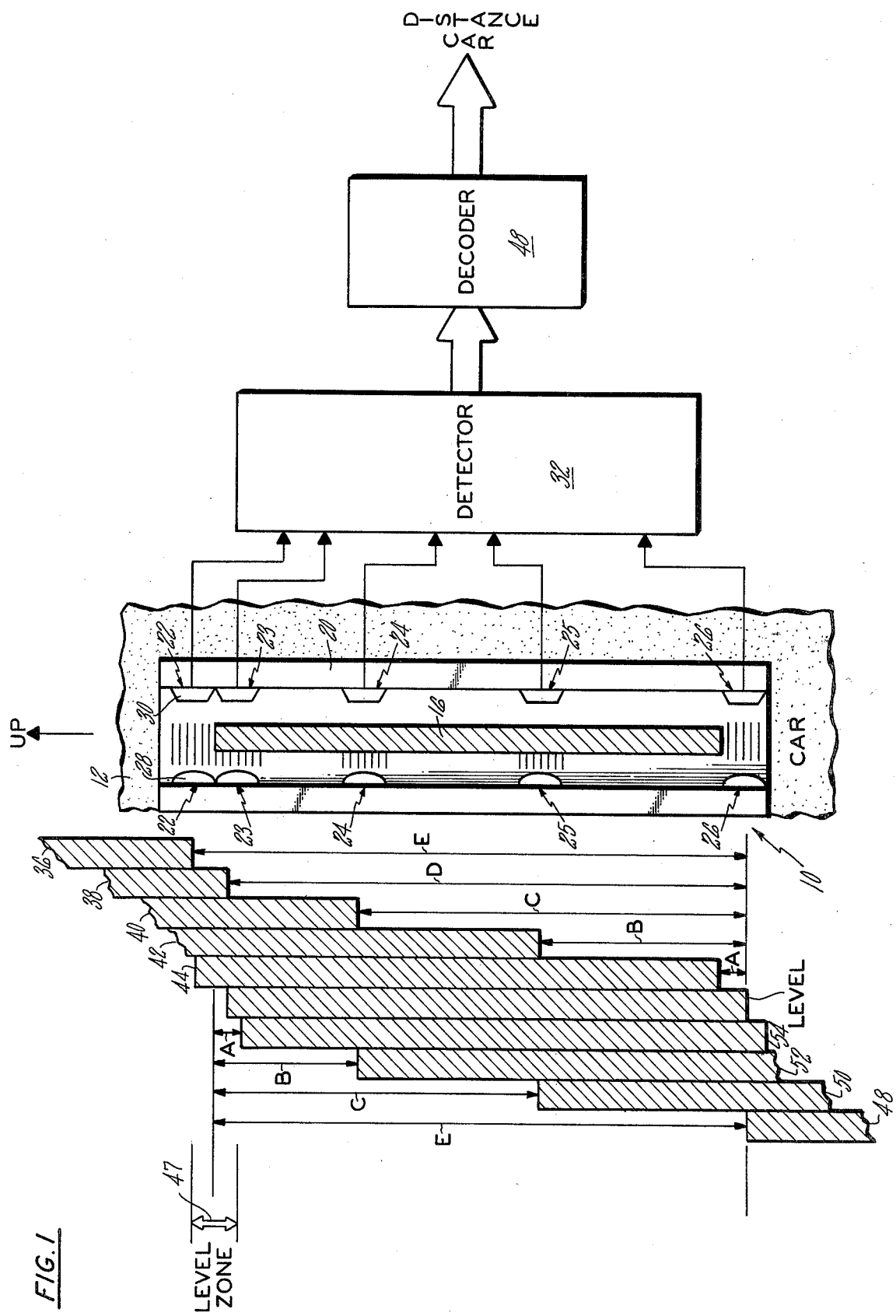
FIG. 1 is a section along the line 1—1 in FIG. 2; it shows an apparatus of the present invention together with its associated electronics in block diagram form and the vane positions for different distances above and below the floor.

Referring to FIGS. 1 and 2, a rigid, preferably metal, U-shaped column or channel piece 10 is mounted on a wall 12 of the elevator car with its jaw or open portion facing a wall 14 of the elevator shaft. A rigid metal L-shaped vane member 16 is fastened to the wall 14 at a preselected distance above or below the floor (not shown). As the elevator car approaches the floor, side 18 of the L-shaped member 16 extends within the jaw of the channel 10 in the manner shown in FIGS. 1 and 2.

Located on one wall 20 of the column are five transmitter-receiver units 22-26, each unit preferably includes an energy radiator transmitter or source, i.e. a lamp 28 and a receiver or sensor, i.e. a photocell 30 which is responsive to the radiated energy from its companion transmitter lamp. Such devices are well known in the prior art, of course. The receivers are spaced apart on the channel at predetermined distances as shown in FIG. 1. An output signal is produced by each photocell 30 when it is turned on when it receives light from its companion lamp 28. The signal is supplied to a detector 32 which generates a binary signal indicating which receivers are ON and which are OFF. The photocell 30 is shown in its ON condition in FIG. 1, where light from lamp 28, for example, is being received. The photocells in units 24–26 are OFF, however, in FIG. 1, because the vane 16 is obscuring or occluding the light path from their companion lamps.

The photocell 30 in each unit will turn OFF when more than 50% of the light from the lamp 28 is blocked by the vane. There are transition areas 33 between ON and OFF on either side of the centerline 34 (FIG. 3) between which no change in state will take place. Typically, these transition areas are $\frac{1}{8}$th of an inch on either side of the centerline. Hence, there is a possible maximum $\frac{1}{4}$th inch vane movement that may not be positively detected by a single photocell. However, since location information is derived from the aggregate ON-OFF states of all the units a compensating characteristic arises because the units at the uppermost position (units 22 and 23 for example) respond oppositely from unit 26: one turns OFF as the other turns ON. Furthermore since the maximum floor to car distance typically is approximately nine inches the error is insignificant. If the apparatus is used with the self-adjusting leveling apparatus of my copending application the error—if any—is virtually eliminated.

The left-hand portion of FIG. 1 shows the vane positions indicative of various car positions near the floor. FIG. 4 is a truth table showing the ON-OFF states of the units for those positions and the indicated car to floor level distance. In the vane position 36, for example, the car is approaching the floor from below and the lamp 28 in the unit 22 is in transition whereas the other units 23–26 are ON. This corresponds to the distance E below floor level. At the position 38, however, the unit 22 is completely OFF; it is blocked by the vane while unit 23 is in transition; thus indicating that the car is at the distance D below the floor; but closer to floor level. The same explanation applies to the other vane positions 40, 42 and 44. At the position 44 the car is extremely close to floor level; merely the short distance A below. Position 46, however, is at a floor level position (within the level zone explained hereinafter) corresponding to the position of the vane 16 within the channel as shown in the right-hand side of FIG. 1. As the car approaches from the top or higher floors, the sequence reverses as the vane moves from positions 48 through positions 50, 52 and 54, which respectively correspond to distances E, C, B and A above the floor. At the position 46 the car is again level, of course. The corresponding ON-OFF characteristics for the photocells appears in the table of FIG. 4 for each of the foregoing positions; the respective distances are shown also. As mentioned previously the detector 32 responds to the output from each photocell and preferably is adapted to generate a binary signal indicating the individual states of each ON-OFF characteristic and the aggregate ON-OFF condition photocell as a single aggregate data word; for example, a five bit word. From this word, the four bit decoder unit 48 generates another data word, for the actual distances above and below the floor level. Needless to say the data word binary information is used with conventional well-known elevator control apparatus for braking and advance door opening in accordance with known principles and concepts. The on-off state of the unit 23 defines a floor level zone or "bracket" distance within which the car can be moved on either side of the floor level (position 44) without producing a change in any of the other units. When the car is substantially at the floor level, the receiver in the unit 23 is in a transition state (see FIGS. 3 and 4); the other units, on the other hand, are either on or off. As shown in FIG. 4, if the car moves between positions 44 and 48, the receiver 23 changes state, and thus provides a positive indication of such movement (which is approximately $\frac{1}{8}$th inch, depending on the transition characteristics of the specific receiver). It should be realized that without the use of the unit 23 the car could move undetected between positions 42 and 48; thus the unit 23 eliminates this blind spot.

A frequently used advance door opening zone is approximately nine inches. This distance provides adequate time in advance of actual floor level positioning before the car doors begin to open. Using a typical photocell 30 with a $\frac{1}{8}$th inch transition area about its centerline the following distances for the relative location of the units 23–26 on the vane has been found to be satisfactory to provide that nine inch zone. These distances refer to the distance for the receiver in each unit, and each distance is from the centerline of each receiver. For a 9 inch zone the receiver in the unit 24 is 3 inches below the receiver in unit 23; the receiver in unit 25 is $2\frac{3}{4}$ inches below the receiver in unit 24 and finally the receiver in unit 26 is $3\frac{3}{8}$ inches below the receiver in unit 25. The car distances A, B, C, D, E in FIG. 4 correspond to these real or actual distances: A = $\frac{3}{8}$ inch; B = 3 inches; C = $5\frac{3}{4}$ inches; D = $8\frac{3}{4}$ inches and E = $9\frac{1}{8}$ inches.

Certain additional observations can be made from the foregoing. The described apparatus provides a precise distance "zone" to the floor level from the output produced from the detector as defined in the truth table of FIG. 4. In an advanced application of the concept in the apparatus, it is possible to ascertain the actual transition response of the detector units and thus provide a more accurate output. However, since there is a consistency in the transition zones for typical optical or other radiation devices the vane can be adjustably positioned on the shaft wall to compensate for any resulting error due to the transition distance. In other words, the vane can be adjusted on the shaft wall so that the floor level position corresponds to the actual floor level. Of greater significance, it is clear that the apparatus of the present invention provides actual measured distance information to the floor. Hence if the shaft changes its dimensions the vane will correspondingly move with respect to the car movement and thus still provide substantially the same distance information. The apparatus thus avoids the prior art inaccuracies. At the same time, it uses a minimizing number of detector units to provide needed distance and leveling information.

I have described the preferred embodiment of the present invention. To one skilled in the art possible obvious modifications and variations will be suggested. The claims that now follow, however, are intended to cover all such modifications and variations embracing the true scope and spirit of the invention.

I claim:

1. A floor level distance sensing apparatus for an elevator car suspended in a shaft, comprising:

at least five paired energy radiating transmitters and receivers, said pairs being at predetermined distances from each other in the direction of car movement in the shaft and the energy from each transmitter activating its corresponding receiver, means for deactivating the receivers as the car reaches predetermined distances from the floor by blocking the energy transmission path between each said transmitter and its paired receiver and deactivating an increasing number of said receivers as the car approaches the floor level, the number and sequence of activated and deactivated receivers representing a maximum distance from the car to floor one of said receivers being located with respect to the others and with respect to the floor so that it can be activated and deactivated, when the car is within a preset level zone at the floor, for identifying car movement within that zone regardless of said number and sequence, and two of said receivers being in an opposite state from the remaining two when the car is within said level zone.

2. The apparatus of claim 1, wherein said one receiver is in a transition state when the car is substantially at the floor level.

* * * * *